United States Patent
Sheth

(10) Patent No.: US 7,664,877 B1
(45) Date of Patent: Feb. 16, 2010

(54) METHODS AND APPARATUS FOR USING BOTH LDP AND RSVP IN A COMMUNICATIONS SYSTEMS

(75) Inventor: Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 803 days.

(21) Appl. No.: 10/099,510

(22) Filed: Mar. 15, 2002

Related U.S. Application Data

(60) Provisional application No. 60/277,033, filed on Mar. 19, 2001.

(51) Int. Cl.
*G06F 15/173* (2006.01)

(52) U.S. Cl. .................................................... 709/242

(58) Field of Classification Search ................ 709/217, 709/225, 238–245; 455/428; 379/272; 370/351
See application file for complete search history.

(56) References Cited

U.S. PATENT DOCUMENTS

| | | | | | |
|---|---|---|---|---|---|
| 6,069,889 | A | * | 5/2000 | Feldman et al. | 370/351 |
| 6,205,488 | B1 | * | 3/2001 | Casey et al. | 709/238 |
| 6,487,170 | B1 | * | 11/2002 | Chen et al. | 370/231 |
| 6,665,273 | B1 | * | 12/2003 | Goguen et al. | 370/252 |
| 6,697,361 | B2 | * | 2/2004 | Fredette et al. | 370/389 |
| 6,765,921 | B1 | * | 7/2004 | Stacey et al. | 370/401 |
| 6,826,196 | B1 | * | 11/2004 | Lawrence | 370/466 |
| 7,046,680 | B1 | * | 5/2006 | McDysan et al. | 370/396 |
| 7,336,648 | B1 | * | 2/2008 | Sasagawa | 370/351 |
| 2001/0032271 | A1 | * | 10/2001 | Allen | 709/239 |
| 2002/0004843 | A1 | * | 1/2002 | Andersson et al. | 709/238 |
| 2002/0018269 | A1 | * | 2/2002 | Chaudhuri et al. | 359/165 |
| 2002/0122432 | A1 | * | 9/2002 | Chaskar | 370/466 |
| 2004/0213206 | A1 | * | 10/2004 | McCormack et al. | 370/352 |
| 2007/0206494 | A1 | * | 9/2007 | Swallow | 370/225 |

OTHER PUBLICATIONS

Wright, Gregory et al. "CR-LDP Extensions for Interworking with RSVP-TE" Mar. 2000, MPLS Working Group Internet Draft, Nortel Networks. 29 pages.*
Viswanathan, Arun et al. "Evolution of Multiprotocol Label Switching" May 1998, IEEE Communications Magazine, pp. 165-173.*
Pulley, Robert et al. "A Comparison of MPLS Traffic Engineering Initiiatives" Netplane Systems, INC. Copyright 2000. pp. 1-12.*
C. Semeria, "Traffic Engineering for the New Public Network", pp. 1-24 (Sep. 23, 1999).
C. Semeria, "Multiprotocol Label Switching Enhancing Routing in the New Public Network", pp. 1-20 (Sep. 27, 1999).
C. Semeria, "RSVP Signaling Extensions for MPLS Traffic Engineering", pp. 1-29 (Sep. 2000).

* cited by examiner

*Primary Examiner*—Andrew Caldwell
*Assistant Examiner*—Benjamin Ailes
(74) *Attorney, Agent, or Firm*—Straub & Pokotylo; Michael P. Straub

(57) ABSTRACT

Methods and apparatus for allowing routers in an autonomous system to implement LDP and RSVP at the same time. RSVP can be used in the network core with LDP being used in network regions surrounding the core. LDP LSPs are tunneled through the RSVP network core using RSVP LSPs and label stacking techniques. During route selection LDP LSPs which use an RSVP LSP tunnel are preferred over alternative LDP LSPs having an equal cost associated with them to create a preference for traffic engineered routes.

27 Claims, 8 Drawing Sheets

METHODS AND APPARATUS FOR USING BOTH LDP AND RSVP IN A COMMUNICATIONS SYSTEMS

RELATED APPLICATION

This application claims the benefit of U.S. Provisional Application No. 60/277,033, filed Mar. 19, 2001.

FIELD OF THE INVENTION

The present invention is directed to methods and apparatus for implementing communications systems, and, more particularly, to methods and apparatus for establishing and using label switched paths.

BACKGROUND OF THE INVENTION

Communications networks such as the Internet are used for transmitting information, e.g., digital data, from one device to another. Each communications network normally comprises a plurality of nodes, implemented using, e.g., routers, which are inter-connected by links over which data and control signals can pass. For ownership and administrative purposes, routers are frequently grouped together into sub-networks. Individual sub-networks which are made up of components which can be managed by a common administrator are sometimes referred to as an autonomous systems ("AS"). ASs may interact with one another to form much larger networks.

Internet service providers (ISPS) frequently implement one or more ASs. Each ISP is normally responsible for administering the AS which it owns and implements. The Internet comprises multiple ASs which interact with one another. As the amount of Internet traffic has grown, ISPs have been confronted with the problem of having to transmit ever increasing amounts of data over networks having an ever increasing number of nodes. In addition to being confronted with ever increasing amounts of traffic, ISPs continue to confront cost pressures which make it important to use network capacity in an efficient manner.

In older systems which relied on the Internet Gateway Protocol (IGP) for routing, the routing of packets was left to individual routers which would select the next hop, e.g., route to the next node, to be used to reach a destination based on a least cost, e.g., shortest path first (SPF), algorithm. The SPF algorithm was normally applied to a set of network information obtained from a plurality of broadcast messages including network topology information. The label distribution protocol (LDP) is a protocol that is normally used in non-traffic-engineered applications where the IGP determines the routing to be used.

Allowing individual routers along a communications path to determine routing by selecting the next router to be used reduces administrative complexity. However, it tends to result in routers along the shortest path between high traffic routers to become congested while other routers may become under utilized.

In recent years, in order to use network components efficiently, ISPs have begun to rely on traffic engineering. Traffic engineering allows administrators to explicitly control the flow of traffic through a network. Thus specific routes, e.g., paths, or portions of routes, can be established for the flow of traffic between various routers. Thus, in a traffic engineered system a router at the edge of an AS can specify the path which is to be used for specific data, e.g., IP packets with a particular destination address, through the AS. Since the full path through the network can be specified, data between nodes may be made to flow along routes other than the route that would be determined using a shortest path first routing algorithm.

In order to support traffic engineering, route establishment protocols such as the Resource ReSerVation Protocol (RSVP) are frequently used to establish paths through an AS. RSVP path establishment messages are transmitted along the path being established and are not broadcast to all routers in an AS.

For numerous reasons, ISP providers have chosen to implement individual ASs by using either LDP or RSVP throughout the AS but not both. In many modern systems where the benefits of traffic engineering are desired, this means that RSVP and not LDP is used for purposes of distributing routing, e.g., path, information.

Given that there are different and distinct benefits to using the LDP and RSVP protocols, it would be desirable to be able to selectively implement LDP and RSVP in different portions of a single AS. In some cases, it would also be desirable to simultaneously implement LDP and RSVP on the same router.

SUMMARY OF THE INVENTION

The present invention is directed to methods for establishing and using communications networks which use label switching in at least some portions of the communications network. In accordance with the present invention one or more routers implement LDP and RSVP at the same time.

Accordingly, unlike prior art autonomous systems which normally ran LDP or RSVP but not both, the present invention allows for an autonomous system to be implemented using RSVP and LDP at the same time. In accordance with the present invention RSVP and LDP can be run selectively on some routers but not on others. For example, a network core may be implemented using RSVP while network elements outside the core run LDP. Network elements which border the RSVP and LDP domains can, and in some embodiments do, implement both LDP and RSVP simultaneously. In this manner, RSVP can be used for traffic engineering while LDP can also be used, e.g., to avoid distribution of external routes in the core of the network and/or to avoid the need for RSVP throughout the network.

In order to traverse a portion of the network which supports RSVP but not LDP, an RSVP LSP is used to tunnel the LDP LSP across the RSVP portion of the network. The ingress and egress routers corresponding to the RSVP LSP, used for tunneling, implement both LDP and RSVP in accordance with the present invention.

The RSVP LSP ingress router being used to tunnel an LDP LSP performs label stacking. The RSVP LSP ingress router adds an outer RSVP LSP label to the packet being transmitted and an inner LDP LSP label. If the RSVP LSP ingress router is also the LDP LSP ingress router the label stacking operation represents a double push operation. If the RSVP LSP ingress router is a transit router in the LDP LSP the adding of the inner and outer labels represents a LDP LSP label swap operation which is performed in conjunction with an RSVP LSP label push operation.

A penultimate router in a RSVP LSP which is used to tunnel an LDP LSP is responsible for removing, i.e., popping, the outer RSVP LSP label prior to forwarding it to the RSVP LSP egress router. When the RSVP LSP egress router is a transit router in the LDP LSP, it forwards the packet based on the received LDP LSP label and the information included in its forwarding table. The forwarding may involve a label swapping or label popping operation. When an RSVP LSP egress router is also the egress router for the LDP LSP being tunneled, the egress router pops the LDP LSP label on the received packet prior to forwarding it based on IP address or other information included in the received packet.

The present invention allows for multiple alternative LDP paths through a network. Some of the LDP paths may involve the use of RSVP LSP tunnels. Cost information associated with possible LDP paths through the network is normally stored in a router. In accordance with the present invention, when selecting between alternative LDP paths, an LDP path which uses an RSVP LSP tunnel is preferred over an LDP path having the same associated cost but which does not use an RSVP LSP tunnel. In this way, a preference for traffic engineered paths is introduced in at least some embodiments.

Various additional features and advantages of the present invention will be apparent from the detailed description which follows.

DETAILED DESCRIPTION

As discussed above, the present invention is directed to methods and apparatus for implementing communications systems which use label switched paths established using one or more communications protocols, e.g., RSVP and LDP.

Figure 1:
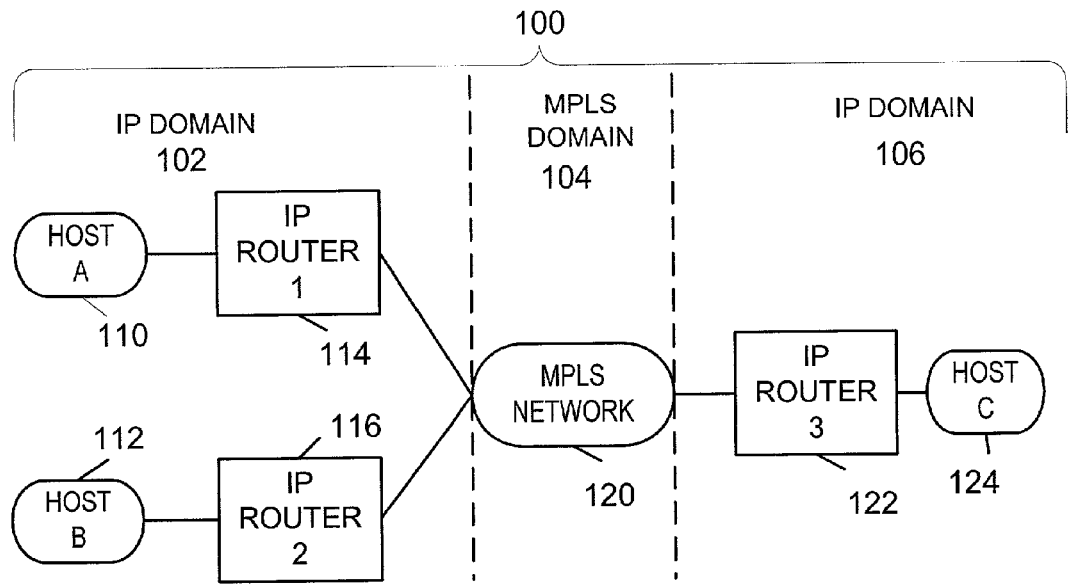
FIG. 1 illustrates a communications system implemented in accordance with the present invention.

FIG. 1 illustrates a communications system 100 implemented in accordance with the present invention. The communications system 100 includes a plurality of host devices, e.g., host A 110, host B 112, and host C 124 which generate and receive messages using, e.g., TCP/IP. The host machines 110, 112, 124 may be, e.g., personal computers, personal data assistants, etc. The host machines 110, 112, 124 are coupled to a label switching network 120, by IP routers 114, 116, 122. In the present application, the label switching network is described as an exemplary multiprotocol switching (MPLS) network. However, it is to be understood that the invention may be used with other types of label switching. IP routers 114, 116, 122 support routing of packets based on the Internet Protocol (IP) and the IP address included in each transmitted IP packet.

MPLS network 120 is an AS which can be used as part of the Internet backbone. As part of the Internet backbone, MPLS network 120 may be coupled to various additional systems, e.g., other ASs.

The communications system 100 can be divided into different domains, e.g., network regions, according to the routing technique used. In FIG. 1, the system 100 is divided into first and second IP domains 102, 106 and MPLS domain 104.

In IP domains 102, 106 routing is based on IP addresses. For example, IP routers 114, 116 and 122 perform longest match routing where an IP address in a received packet is compared to routing information in a table to identify the next network element, e.g., router or device, to which the packet should be forwarded. Within the MPLS domain 104 label switching is used to control packet routing.

In the MPLS domain label switching routers (LSRs) are used to carry Internet Protocol (IP) traffic. In an MPLS network, MPLS is used to direct a flow of packets along a network path, referred to as a label-switched path (LSP). Each LSP is established prior to the transmission of data packets over the LSP through the use of one or more protocols such as RSVP and LDP.

Figure 2:
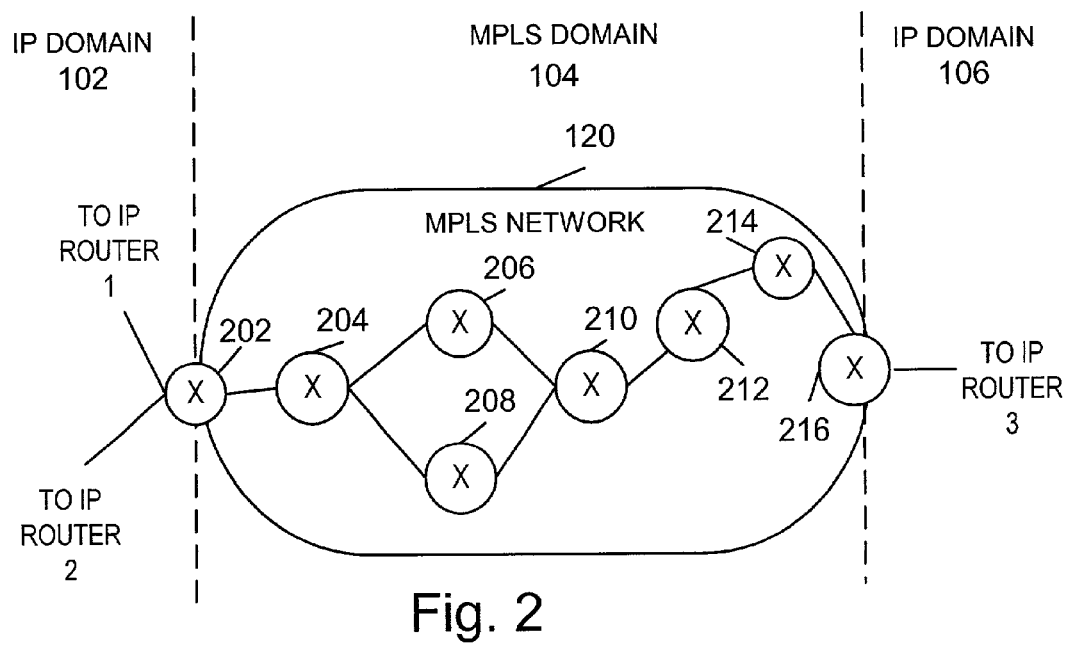
FIG. 2 is a more detailed illustration of a portion of the communications system shown in FIG. 1.

FIG. 2 illustrates the MPLS network 120 in greater detail. As illustrated, the network 120 includes a plurality of label switching routers (LSRs) 202, 204, 206, 208, 210, 212, 214, 216. Communications links between the LSRs are shown as solid lines. Such connections may be, e.g., fiber optic connections, T1 links, etc. LSRs 202, 216, which border an IP domain 102, 106, can be used to receive IP packets from the neighboring IP domain or transmit IP packets from the MPLS domain to a router or other device in the IP domain 102 or 106. Label switched paths (LSPs) may be established by configuring routing information in the LSRs 202, 204, 206, 208, 210, 212, 214, 216 to transmit packets between the LSRs over a selected physical path. As will be discussed below, various protocols including RSVP and LDP may be used in accordance with the present invention to establish LSPs. An LSP may be used to transmit packets between two points, e.g., routers. In such a case, a packet received at the input of an LSP is output by the router at the end of the LSP. When an LSP is used in this manner the LSP is sometimes referred to as a tunnel or, more commonly, an LSP tunnel.

Figure 3:
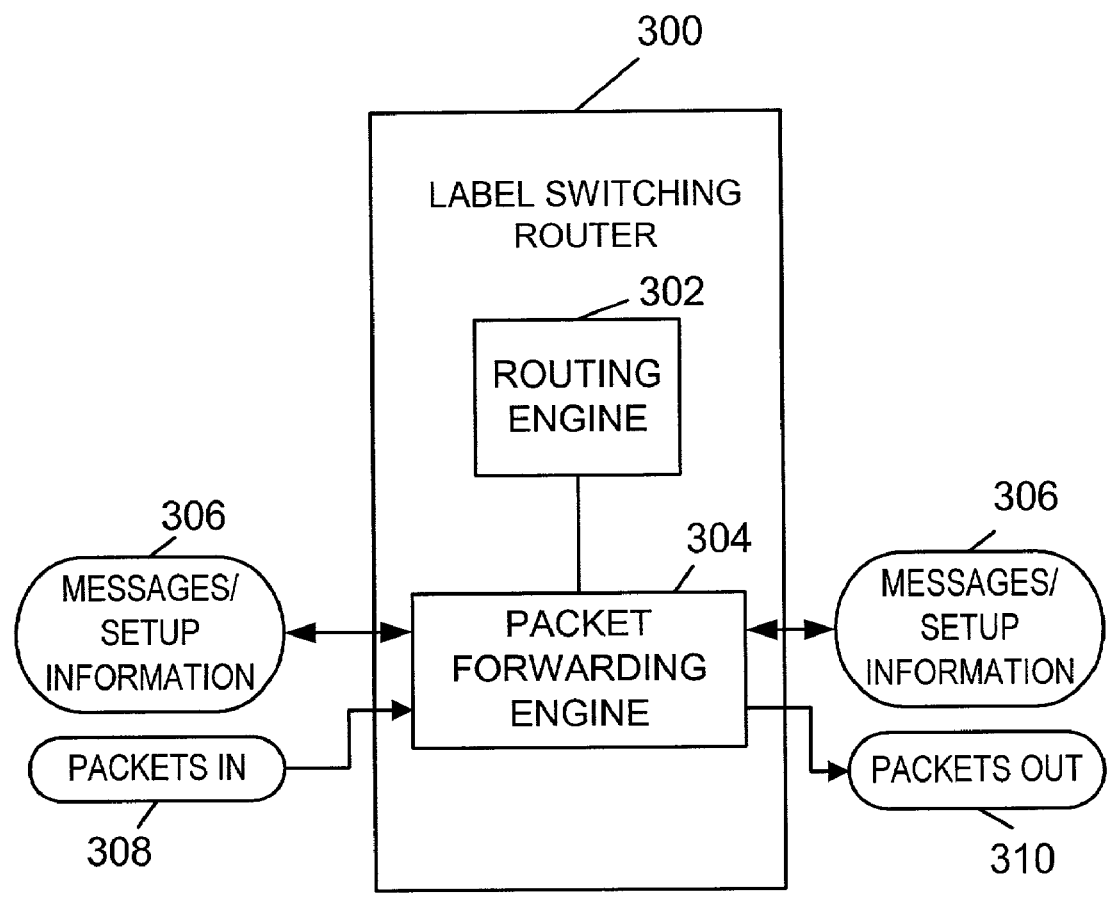
FIGS. 3 and 4 illustrate a label switching router that can be used in the communications system of FIG. 1.

FIG. 3 illustrates a label switching router (LSR) 300 implemented in accordance with the present invention. The LSR 300 may be used as any one of the routers 202, 204, 206, 208, 210, 212, 214, 216 shown in FIG. 2. The LSR 300 includes a routing engine 302 and a packet forwarding engine 304. The routing engine 302 is responsible for path calculations and maintenance of various forwarding tables. As will be discussed below, the routing engine 302 of the present invention, unlike known routing engines, is capable of supporting LDP and RSVP simultaneously.

The packet forwarding engine 304 is responsible for forwarding packets using the forwarding table(s) created by the routing engine 302. As part of the forwarding operation, the packet forwarding engine 304 receives packets 308 and outputs packets 310. The packet forwarding engine is also responsible for receiving and transmitting various route setup messages and signals 306. The route setup messages and signals 306 are used by the routing engine 302 to establish routes through a network and to create forwarding table(s) used by the packet forwarding engine 308. Separating the packet forwarding operations from the route computation operations used to generate the forwarding tables allows the task of route computation to be performed independently from the task of forwarding packets.

Figure 4:
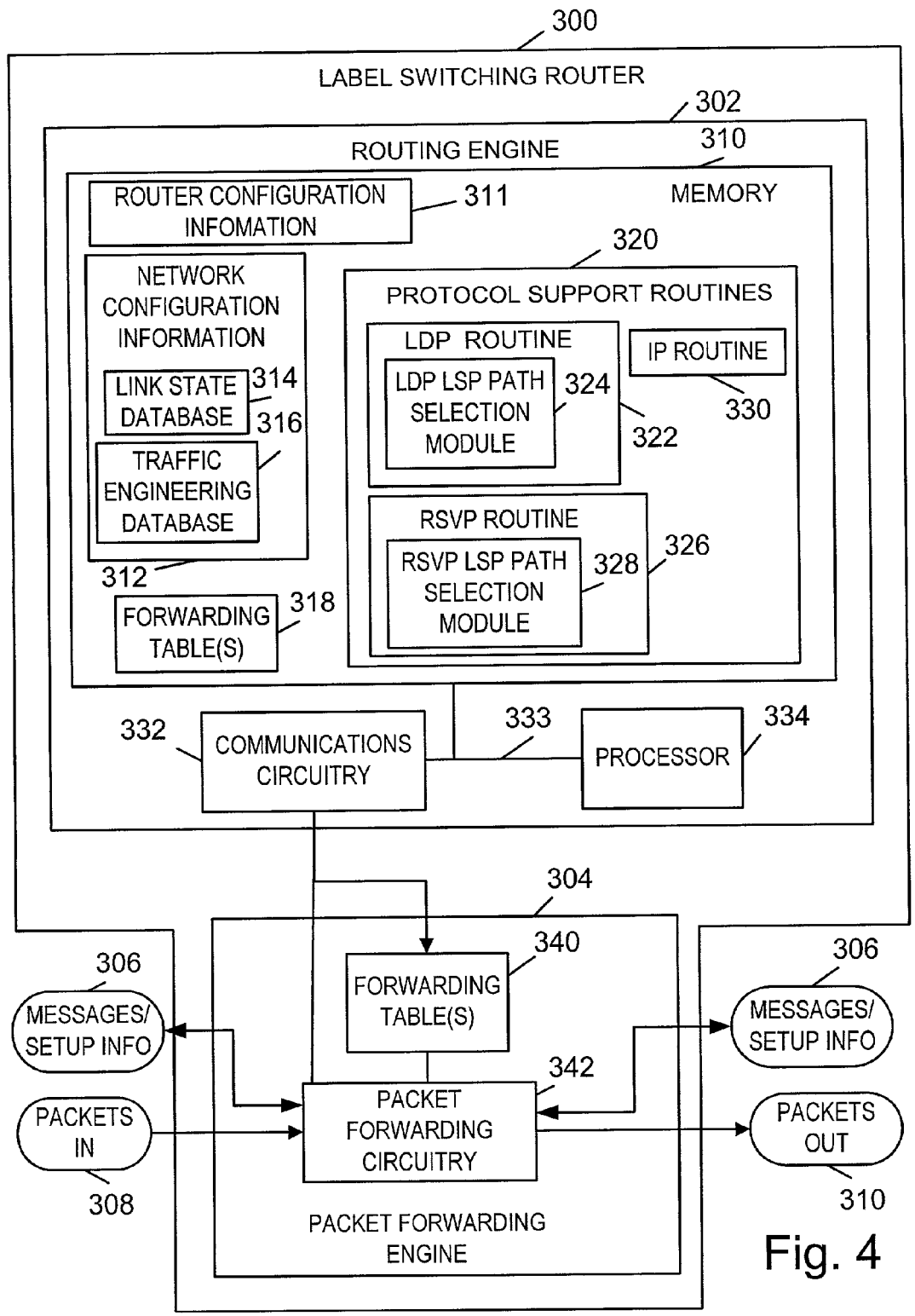

FIG. 4 illustrates the LSR 300 in greater detail. As illustrated in FIG. 4, the packet forwarding engine includes packet forwarding circuitry 342 and one or more forwarding tables 340. Packet forwarding circuitry 342 is responsible for performing actual routing operations and for the receipt and transmission of network configuration and path setup messages which are relayed to and from the routing engine 302.

The routing engine 302 includes communications circuitry 332, memory 310 and a processor 334 which are coupled together by a bus 333. The communications circuitry 332, is coupled to the packet forwarding engine 304 and is used by the routing engine 310 to receive and send messages 306. The routing engine 302 can also use communications circuitry 332 to download forwarding tables it generates to the packet forwarding engine 304.

Memory 310 is used to store router configuration information 311, network configuration information 312, protocol support routines 320, and forwarding table(s) 318.

Router configuration information 311 includes information on which protocols are to be supported by the LSR 300 at any given time, whether label stacking is to be enabled, whether the router is to be used for tunneling LDP LSPs in accordance with the present invention, whether traffic engineered shortcuts are to be used, and information on a wide variety of other features and/or services to be supported, e.g., provided, by the LSR 300 at any given time. While the LSR 300 is capable of supporting multiple protocols, a system administrator can set control parameters in the router configuration information 311 to control which protocols are actually enabled, i.e., implemented, at any given time. In accordance with the present invention IP, LDP and RSVP can all be enabled at the same time. Alternatively one or more of these protocols may be enabled. For example, in the case of an edge router that borders an IP and MPLS domain the IP protocol would be enabled while one or both of LDP and RSVP would also be enabled. Within the MPLS domain LDP and/or RSVP would normally be enabled but not IP.

The network configuration information 314 includes a link state database 314 and a traffic engineering database 316. The link state database 314 includes network topology information obtained, e.g., from LDP setup messages and other sources. The link state database 314 includes network topology information of the type normally used for making Interior Gateway Protocol (IGP), e.g., SPF, routing decisions. The traffic engineering database 316 includes network topology information of the type included in the link state database 314 but also includes additional information, e.g., information on the bandwidth of links, suitable for use in traffic engineered route determinations. In making traffic engineered route determinations the open shortest path may not be the path selected for routing purposes due to consideration of one or more constraints such as available bandwidth, etc.

The router configuration information 31 is used to determine which protocols are to be supported and thus which protocol routines in the set of routines 320 are to be executed at any given time. The protocol support routines 320 include an LDP routine 322, an RSVP routine 326, and an IP routine 330.

The LDP routine 322 is responsible for providing LDP functionality, including LDP messaging capabilities, to the LSR 300. The LDP routine 322 includes an LDP LSP selection module 324 which is responsible for determining LSP paths in accordance with information obtained using the LDP protocol. As will be discussed below, LSP path selection may consider whether a LSP will include an RSVP tunnel when selecting between alternative paths. LSPs established using LDP are referred to herein as LDP LSPs.

The RSVP routine 326 is responsible for providing RSVP functionality including RSVP messaging capabilities. RSVP routine 326 includes an RSVP LSP path selection module 328. The RSVP LSP path selection module is responsible for determining LSPs which are to be established using RSVP. Such LSPs will be referred to herein as RSVP LSPs. RSVP path determinations may be based on a wide range of traffic engineering considerations including available bandwidth.

IP routine 330 is responsible for performing IP address based routing operations. Such operations include routing a packet based on the IP address included in the packet and assigning an IP packet to an LSP based on its IP address.

The processor 334 is responsible for controlling operation of the routing engine 302 under direction of the routines 322, 326, 330. The routines 322, 326, 330 may be implemented as software which includes one or more processor instructions. As discussed above, which routines 322, 326, 330 are executed by the processor 334 at any given time is determined, at least in part, based on the router configuration information 311. Thus, when the router configuration information 311 indicates that LDP and RSVP are to be supported, both the LDP routine 322 and RSVP routine 326 will be executed by the processor 334.

By executing one or more of the routines 322, 326, 330 which perform routing, the processor 334 constructs one or more forwarding tables 318 to be used for packet forwarding based upon label or IP address information as well as network configuration information 312. All or a portion of the generated forwarding tables 318 are loaded into the packet forwarding engine 304 by communications circuitry 332. In this manner, the forwarding tables 340 used by the packet forwarding engine are replaced and/or updated by the routing engine 302 as necessary.

Figure 5:
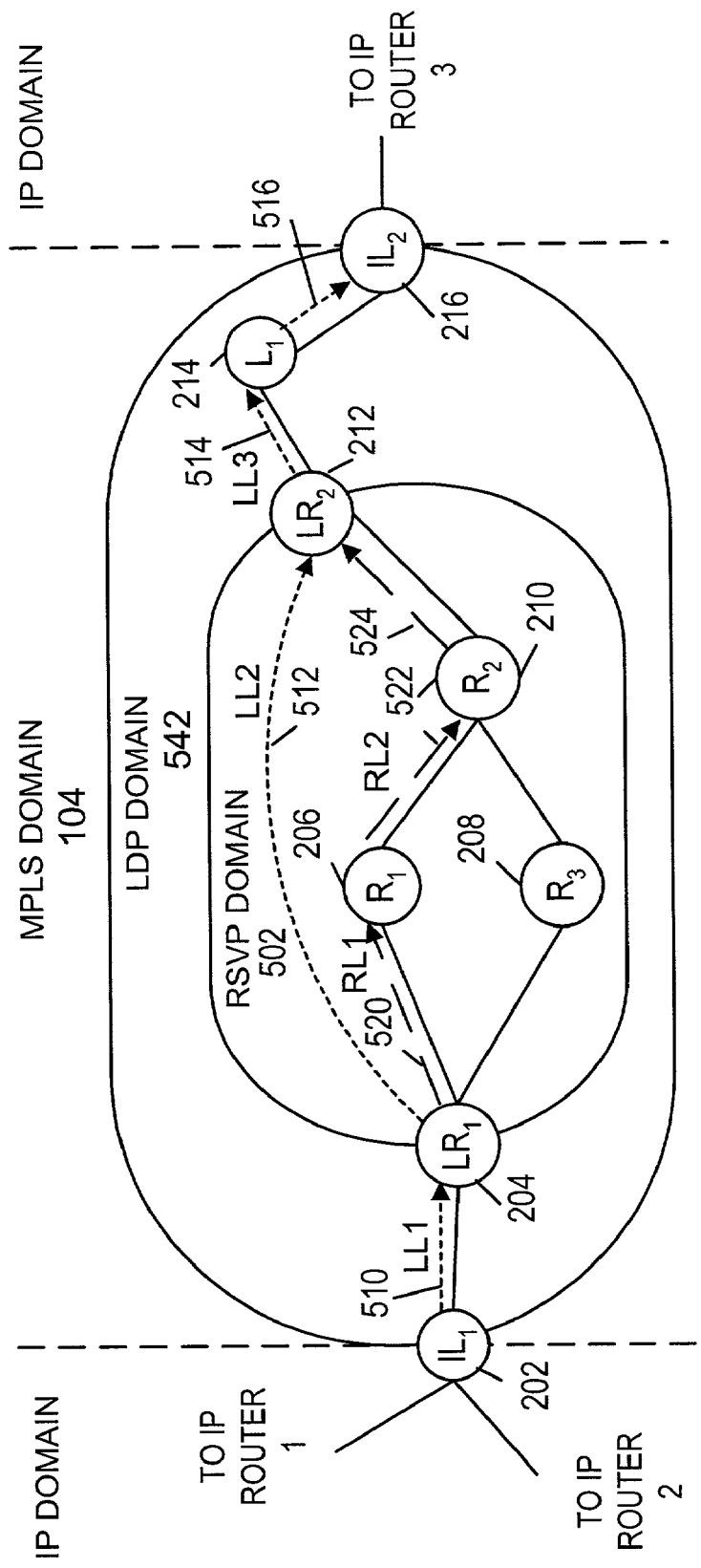
FIG. 5 illustrates a MPLS network including an RSVP LSP and an LDP LSP.

FIG. 5 illustrates the MPLS domain 104 of the communications system 100 with different routers executing different protocols in accordance with one exemplary embodiment. While each of the routers 202, 204, 206, 208, 210, 212, 214, 216 may be implemented using the router 300 illustrated in FIGS. 2 and 3, the configuration information 311 in each router is set to reflect the specific protocols to be supported by the individual router.

The routers illustrated in FIG. 5 may be divided into four groups based on the protocols which they actively support. The four groups are as follows: 1) routers 202, 216 that support both IP and LDP but not RSVP as indicated by the letters IL in the circle used to represent the router; 2) routers 204, 212 that support both LDP and RSVP but not IP as indicated by the letters LR in the circle representing the router; 3) router 214 that supports LDP but not IP or RSVP as indicated by the letter L in the circle representing the router; and 4) routers 206, 206, 210 which support RSVP but not IP or LDP as indicated by the letter R in the circle representing the router.

The routers in the MPLS domain 104 can be divided into further domains based on the protocols that they support. In accordance with one feature of the present invention, the inner core of the network, e.g., the core of the MPLS domain 104, is implemented using RSVP signaling to establish LSPs resulting in an inner RSVP domain 342. Surrounding the RSVP domain is an LDP domain 542 wherein LSP signaling is used to establish LSPs. As will be discussed below, it is also possible to include routers which support both RSVP and LDP in the inner core of the network.

By running RSVP in the core of the network while also using LDP in accordance with the present invention, traffic engineering can be used in the network core while avoiding distribution of external routes through the core.

In accordance with the present invention, LDP LSPs are tunneled through RSVP LSPs which are established between edge routers of the RSVP core. In such an implementation LDP LSPs treat each traversed RSVP LSPs as a single hop in the LDP LSP.

Each LSP, whether established using RSVP or LDP, is formed by a series of LSRs 202, 204, 206, 208, 210, 212, 214, 216 which are selected to route a packet through the MPLS domain.

LSRs in an LSP serve as an ingress router, transit router, or egress router. Each LSP has one ingress router and one egress router and may have any number of transit routers.

An ingress router, also sometimes referred to as a head end router, adds a label used for routing to the received packet. In the case where a received packet is an IP packet, the ingress router encapsulates the IP packet with the label which is being added to form an MPLS packet. In the case where an LSP forms part of another LSP or a virtual private network (VPN), MPLS labels can be stacked. Adding an MPLS routing label to a packet is sometimes referred to as a push operation. After labeling of a packet is complete, the ingress LSR forwards the encapsulated packet, with its routing label or labels, according to the forwarding table 340 maintained by the ingress router.

A transit router uses label and input interface, e.g., port, information in conjunction with a forwarding table to determine how to route a received packet. Each transit router forwards a received MPLS packet to the next router in the LSP after performing a label switching or label removal operation. A label switching operation, called a swap, involves replacing the outer packet label, e.g., the label at the top of a packet label stack in the case of stacked labels, with a new label, e.g., a label obtained from the LSR's forwarding table. A label removal operation called a POP, involves stripping and discarding the outer packet label. After performing the swap or POP operation, the transit router outputs the packet on an output interface (port) specified in the forwarding table thereby sending the packet to the next router in the LSP.

The penultimate LSR in an LSP uses a label value of 0 or, if instructed by the egress router to use a label value of 3, removes the outer MPLS label without adding a new label. When the penultimate router transmits a packet without a label, the need for the egress router to perform a label look-up operation is avoided. This is because an LSR will route a packet received without a label based on its IP address without first performing a label look-up operation as is done when a label is received. In the case of label stacking, it is the responsibility of the penultimate LSR to pop the top label prior to forwarding the packet to the egress router.

An egress router, also sometimes referred to as a tail end router, is the LSR at the end of an LSP. An egress router removes the MPLS encapsulation corresponding to an LSP thus transforming the received MPLS packet into a packet of the same type that entered the LSP.

The technique of the present invention for tunneling LDP LSPs through RSVP LSPs will now be described in detail with regard to FIG. 5. Note that routers $LR_1$, $LR_2$ 204, 212 bordering the LDP and RSVP domain are configured to simultaneously support both LDP and RSVP. In the core routers $R_1$ 206, $R_2$ 210, and $R_3$ 208 are configured to support RSVP but not LDP.

One or more LSPs are first established across the RSVP domain 502 using RSVP. In the FIG. 5 example, $LR_1$ 204 establishes an RSVP LSP through routers $R_1$ and $R_2$ terminating at router $LR_2$. The RSVP LSP comprises hops 520, 522, 524 which are indicated using arrows with long dashes. Label RL1, which stands for RSVP label 1, is associated with the first hop 520, label RL2 is associated with the second hop 522 while no label is used for the last RSVP hop 524. With one or more RSVP LSPs established, the RSVP LSP(s) can be used for tunneling an LDP LSP.

The system administrator indicates by setting configuration information in the RSVP LSP ingress and egress routers 204, 212 indicating that the RSVP LSP is to be used for tunneling LDP LSPs. This may be done by setting one or more control bits in the head end LSR's configuration file 311. This configuration setting may be set prior to establishment of the RSVP LSP(s) to be used for tunneling LDP LSPs.

In response to the configuration setting indicating that an RSVP LSP is to be used for tunneling LDP LSPs, the LSRs 204, 212 at each end of an RSVP LSP, run LDP to initiate extended discovery and set up adjacencies to the endpoints of the RSVP LSP. The LSRs 204, 212 at the endpoints of the RSVP LSP are treated as neighbors for LDP routing purposes. This is done by establishing remote LDP sessions between the head and tail end LSRs 204, 212. The remote LDP session is performed in accordance with the LDP specification which includes support for LDP sessions between routers which are not directly connected to each other. The remote LDP session is like a regular LDP session in terms of the label and routing information which is exchanged between the LSRs 204, 212. Thus, during the remote session, the LSRs 204, 212 involved in the session advertise labels and adjacencies to be used with routes established using LDP while learning labels and adjacencies from the remote LDP neighbor.

MPLS LSPs are unidirectional in nature with the configuration information associated with an LSP normally being independent of the configuration information associated with another LSP. Even when there are RSVP LSPs in both directions between a pair of routers the LDP tunneling configuration information associated with an LSP in one direction is independent of the information associated with the RSVP LSP in the other direction. Thus, while bi-directional communications can be established between LSRs using two unidirectional RSVP LSPs, it is also possible to establish and use a single unidirectional RSVP LSP for tunneling of LDP LSPs in one direction. In such a case, use of LDP will result in labels being advertised during the remote LDP session in both directions. However, in an LSR, a label will not become active in a given direction unless an RSVP LSP is supported in the given direction as indicated by the LSR configuration information 311.

In order to prevent RSVP LSPs, designated in an LSRs configuration table 311 for tunneling LDP LSPs, from being used in BFP next hop calculations, the RSVP LSPs designated for tunneling LDP LSPs will be treated as hidden and will be excluded from BGP next hop calculations. However, the RSVP LSPs designated for tunneling LDP LSPs will still be used in IGP, e.g., OSPF and IS-IS, shortest path first (SPF) computations when determining routes to be used for LDP LSPs within the AS.

In one exemplary embodiment, an administrator can override the hidden treatment of the RSVP LSPs, designated for tunneling LDP LSPs, by setting the LSR's configuration information 311 to enable traffic engineering shortcuts. In such a case, the RSVP LSPs designated for use in tunneling LDP LSPs will be used for BGP route calculations.

In FIG. 5, the router IL1 202 is used to establish an LDP LSP between itself and router IL2 216 from network information learned through LDP messages. The utilized network information is obtained from the LSR's link state database 314. As part of the established LDP LSP, the RSVP LDP used for traversing the RSVP network core is treated as a single hop 512.

In FIG. 5, the exemplary LDP LSP includes routers $IL_1$ 202, $LR1_1$ 204, $LR_2$ 212, $L_1$ 214, and $IL_2$ 216. Note that it also includes routers $R_1$ 206, and $R_2$ 210 because of the use of the RSVP LSP to traverse the network core. However, the presence of these RSVP routers is transparent to the LDP LSP which views the transmission of packets from $LR_1$ 204 to $LR_2$ 212 as a single LDP hop 512. In FIG. 5, the LDP label $LL_1$ is associated with the hop 510 between routers $IL_1$ 202 and router $LR_1$ 204. The LDP label $LL_2$ is associated with the perceived single LDP hop between $LR_1$ 204 and $LR_2$ 212. LDP label $LL_3$ is associated with the hop 514 between $LR_2$ 212 and $L_1$ 214 while no LDP label is associated with the last hop 516 in the LDP LSP between $L_1$ 214 and $IL_2$ 216.

Each router in the MPLS domain 104 stores a forwarding table generated from labels exchanged during LDP sessions and/or RSVP sessions. The forwarding tables are used by the LSRs to determine packet routing based on input interface, e.g., port, and label information. For purposes of explanation, it is assumed that routers illustrated in FIG. 5 receive packets being transmitted on the LSP and RSVP LSPs at port 1 and output the packets on port 2. In practice, multiple input and output ports may be used.

Figure 6:
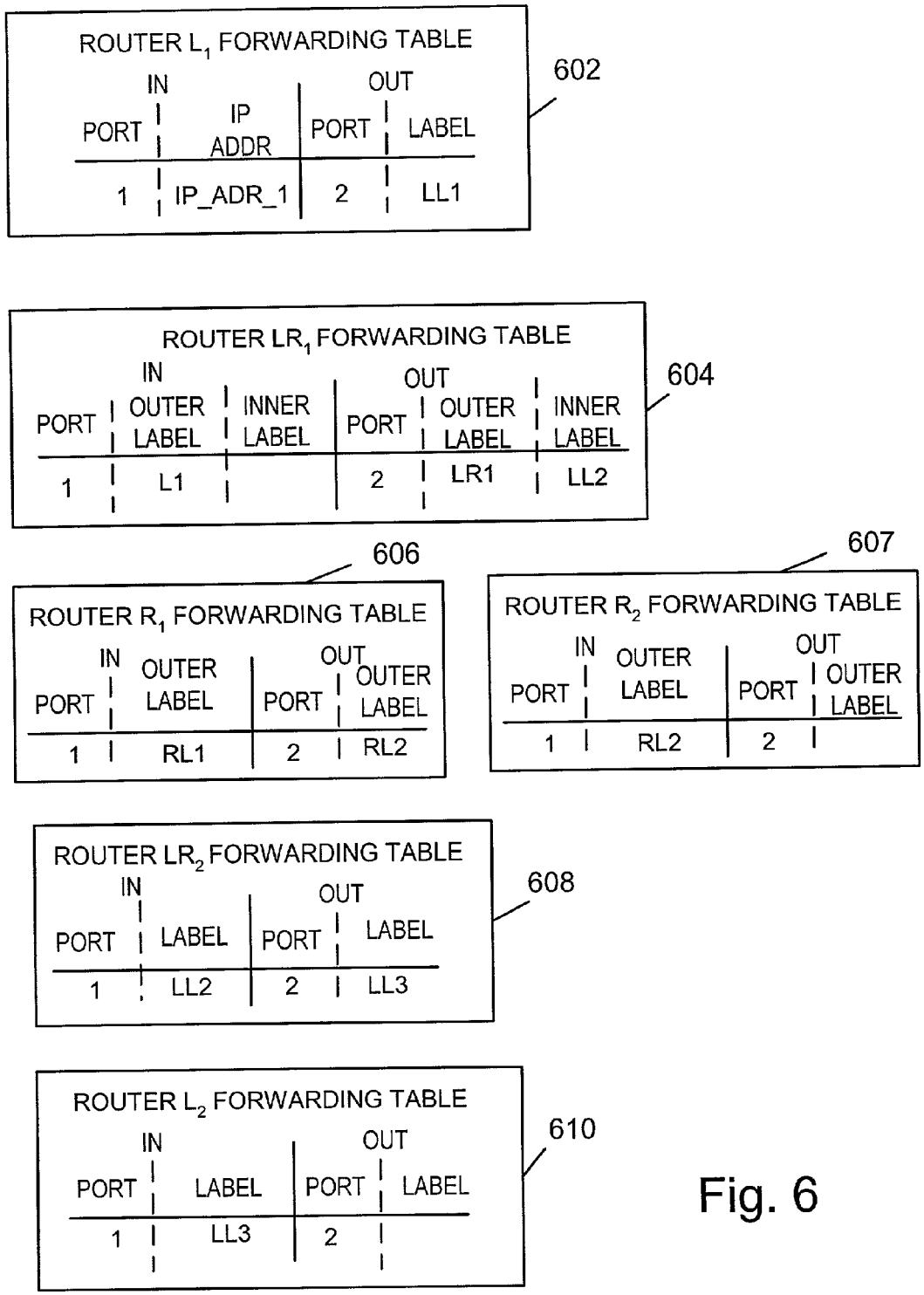
FIG. 6 illustrates forwarding tables used by routers of the MPLS network shown in FIG. 5.

FIG. 6 illustrates router forwarding tables 602, 604, 606, 608, 610, implemented in accordance with the present invention for routers $IL_1$ 202, $LR_2$ 204, $R_1$ 206, $R_2$ 210, $LR_2$ 212 and $L_1$ 214, respectively. The router forwarding tables reflect the creation of the RSVP LSP and LDP LSP shown in FIG. 5. For the purposes of explaining the invention, a single entry is shown in each routing table. However, the illustrated routing tables would normally include multiple entries, each entry corresponding to a different input port and/or different label.

Figure 7:
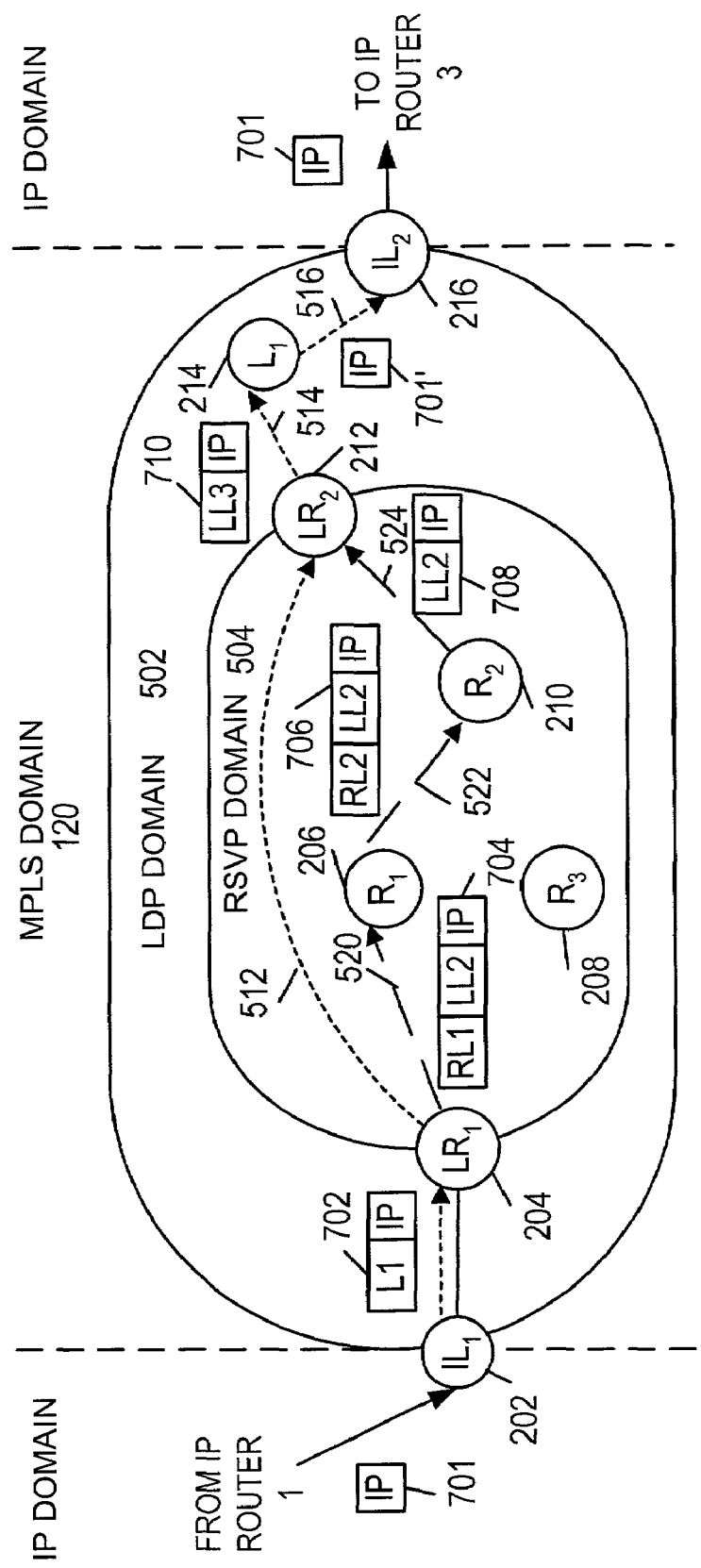
FIG. 7 illustrates the transmission of an IP packet through the MPLS network of FIG. 5 using an LDP LSP which is tunneled through an RSVP LSP.

The transmission of an IP packet 701 across the MPLS domain 120 will now be explained with reference to FIG. 7.

$IL_1$ 202, represents the head end router of the LDP LSP shown in FIG. 5. Based on the information in forwarding table 602, it can be seen that when an IP packet 701 having an IP address IP_ADR_1 is received via port 1 of $IL_1$ 202 it will be encapsulated and output on port 2. The output packet 702 includes the label LL1. Thus, LDP LSP head end router $IL_1$ 202 performs a single push operation.

$LR_1$ 204, represents the head end router of the RSVP LSP used to tunnel the LDP LSP. Based on the information in forwarding table 604, it can be seen that when a packet 701 having a label L1 is received via port 1, the label L1 corresponding to the LDP LSP will be replaced with the label LL2. In addition, the label LR1 corresponding to the RSVP LSP will be added as an outer label. The resulting packet 704 with stacked labels will be output on port 2 of $LR_1$ 204. Thus, RSVP LSP ingress router $LR_1$ 204 performs a label swap operation relating to the LDP LSP in conjunction with a label push operation associated with the RSVP LSP.

$R_1$ 206, is a first transit router in the RSVP LSP. Based on the information in forwarding table 606, it can be seen that when a packet 702 having an outer label RL1 is received via port 1 a swap operation will be performed with the outer label RL1 being replaced with the label RL2 corresponding to the RSVP LSP. The resulting packet 706 will be output on port 2 of $R_1$ 206 with its inner label unchanged.

$R_2$ 210, is the second transit router and the penultimate router in the RSVP LSP. As such, R2 210 is responsible for popping the RSVP LSP label prior to sending the packet to the egress router $LR_2$ 212 in the RSVP LSP. Based on the information in forwarding table 607, it can be seen that when a packet having an outer label RL2 is received via port 1 a pop operation will be performed with the outer label RL2 being discarded prior to packet forwarding. The resulting packet 708 will be output on port 2 of $R_2$ 210 with its inner label unchanged and now serving as the outer label.

$LR_2$ 212, is the egress router in the RSVP LSP and the second transit router in the LDP LSP. As such, $LR_2$ 212 is responsible for routing the packet 708 based on the remaining packet label, i.e., the LDP LSP packet label LL2. Based on the information in forwarding table 608, it can be seen that when a packet having an outer label LL2 is received via port 1 a swap operation will be performed with the outer label LL2 being replaced with the label LL3. The resulting packet 710 is output on port 2 of $LR_2$212.

$L_1$ 214, is the third and penultimate transmit router in the LDP LSP. As such, $L_1$ 214 is responsible for routing the packet based on the packet label, i.e., the LDP LSP packet label LL3. Based on the information in forwarding table 610, it can be seen that when a packet having an outer label LL3 is received via port 1 a pop operation will be performed with the outer label LL3 being discarded. The resulting packet 701' will be output on port 2 of $L_1$ 214 without a label.

$IL_2$ 216 is the egress router for the LDP LSP. When it receives an unlabeled packet 701', it will forward the packet according to the IP address included therein, e.g., to a router in the IP domain 106.

In accordance with the present invention, the ingress and/or egress router for an LDP LSP may be the same as the ingress and/or egress router for an RSVP LSP used to tunnel the LDP LSP.

Figure 8:
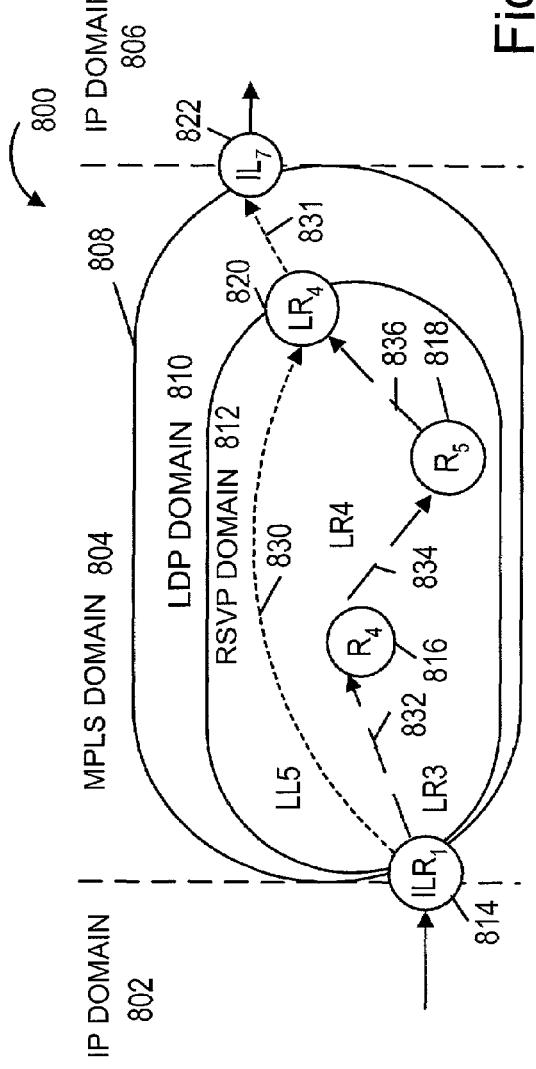
FIGS. 8 and 9 illustrate an MPLS network wherein an RSVP LSP ingress router also serves as the ingress router for an LDP LSP being tunneled through the RSVP LSP.

FIG. 8 illustrates a network 800 comprising routers $ILR_1$ 814, $R_4$ 816, $R_5$ 818 $LR_4$ 820 and $IL_7$ 822. The network 800 includes first and second IP domains 802, 806 and an MPLS domain 804. Within the MPLS domain 804 RSVP and/or LDP are supported. Routers bordering either of the IP domains 802, 806 further support IP. In particular, router $ILR_1$ 814 supports IP, LDP and RSVP. Routers $R_4$ 816, and $R_5$ 818 support RSVP but not LDP or RSVP. Router $LR_4$ 820 supports LDP and RSVP but not IP while router $IL_7$ 822 supports IP and LDP but not RSVP. Within the MPLS domain 804, an LDP domain 810 includes those routers 814, 820, 822 which support LDP while an RSVP domain 812 includes those routers 814, 816, 818, 820 which support RSVP.

An RSVP LSP comprising hops 832, 834 and 836 connects routers $ILR_1$ 814, $R_4$ 816, $R_5$ 818 and $LR_4$ 820. This RSVP LSP is used in accordance with the present invention to tunnel an LDP LSP comprising hops 830, 831 which connects router $ILR_1$ 814 to router $IL_7$ via router $LR_4$ 820. Label LL5 is associated with LDP LSP hop 830 while labels LR3 and LR4 are associated with RSVP LSP hops 832, 834. Note that LDP LSP hop 830 corresponds to RSVP hops 832, 834, 836 since the LDP LSP is tunneled using the RSVP LSP.

Figure 9:
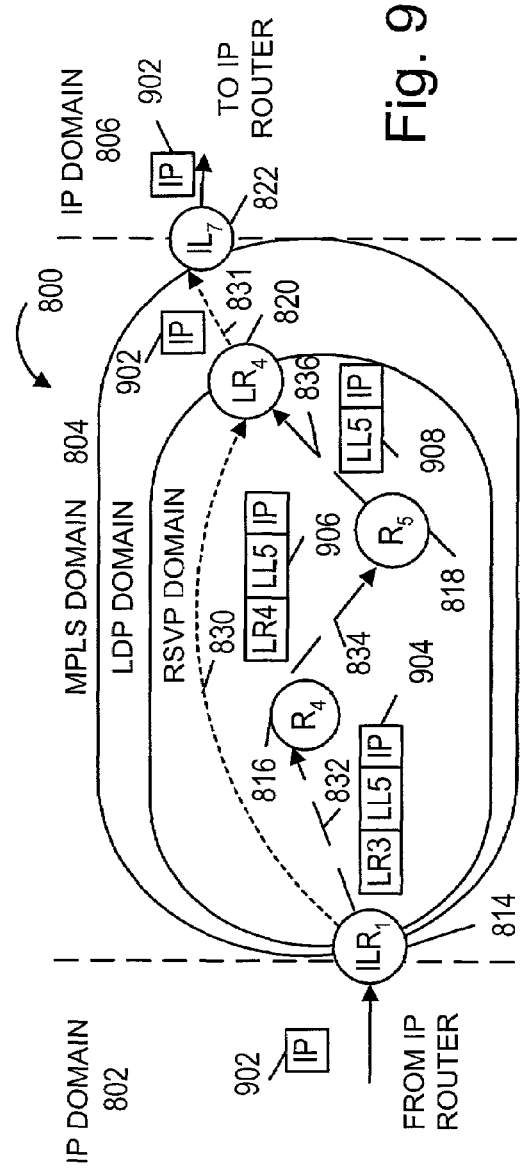

The labeling of an IP packet 902 as it is communicated across the LDP LSP of FIG. 8 is shown in detail in FIG. 9. In the network 800 LSR $ILR_1$ 814 serves as the ingress router for the LDP LSP as well as the RSVP LSP used to tunnel the LDP LSP. Accordingly, $ILR_1$ 814 performs a double push on the received IP packet 902 first adding the label LL5 corresponding to LDP hop 830 and then adding outer label LR3 corresponding to RSVP hop 832. The resulting MPLS packet 904 with stacked labels LR3 and LL5 is communicated to router $R_4$ 816 which is the next router in the RSVP LSP. Router $R_4$ 816 swaps the outer label LR3, with the label LR4 to form MPLS packet 906. Packet 906 is then forwarded to router R5 818 which is the next router in the RSVP LSP.

Router R5 818 is the penultimate router in the RSVP LSP. Accordingly, it pops the outer label LR4 corresponding to the RSVP LSP from the packet 906 to create packet 908. Packet 908 includes the label LL5 corresponding to the LDP LSP. Packet 908 is forwarded to the RSP LSP egress router 820 which also happens to be the penultimate router in the LDP LSP. Router LR4 820 pops the LDP LSP label LL5 and forwards packet 902 to the LDP LSP egress router $IL_7$ 822.

The egress router 822 proceeds to forward the packet 902 to a device in the IP domain based on the IP address included in packet 902.

As discussed above, in accordance with the present invention, RSVP and LDP can be run on different or the same portions of an AS. Thus, in establishing an LDP LSP multiple potential routes across a network may need to be considered. Some of these routes may include use of an RSVP LSP to tunnel portions of an LDP. While other routes may not include the use of RSVP LSPs for tunneling purposes. In accordance with the present invention, the presence or absence of an RSVP LSP in a potential route being considered for use in establishing an LDP LSP is a factor in route selection. In particular, in one embodiment of the present invention, when costs, e.g., a hop count or other cost metric, associated with two potential routes are compared, if the cost associated with both routes is equal, the route which includes the RSVP LSP is selected over the alternative route which does not include an RSVP LSP.

Figure 10:
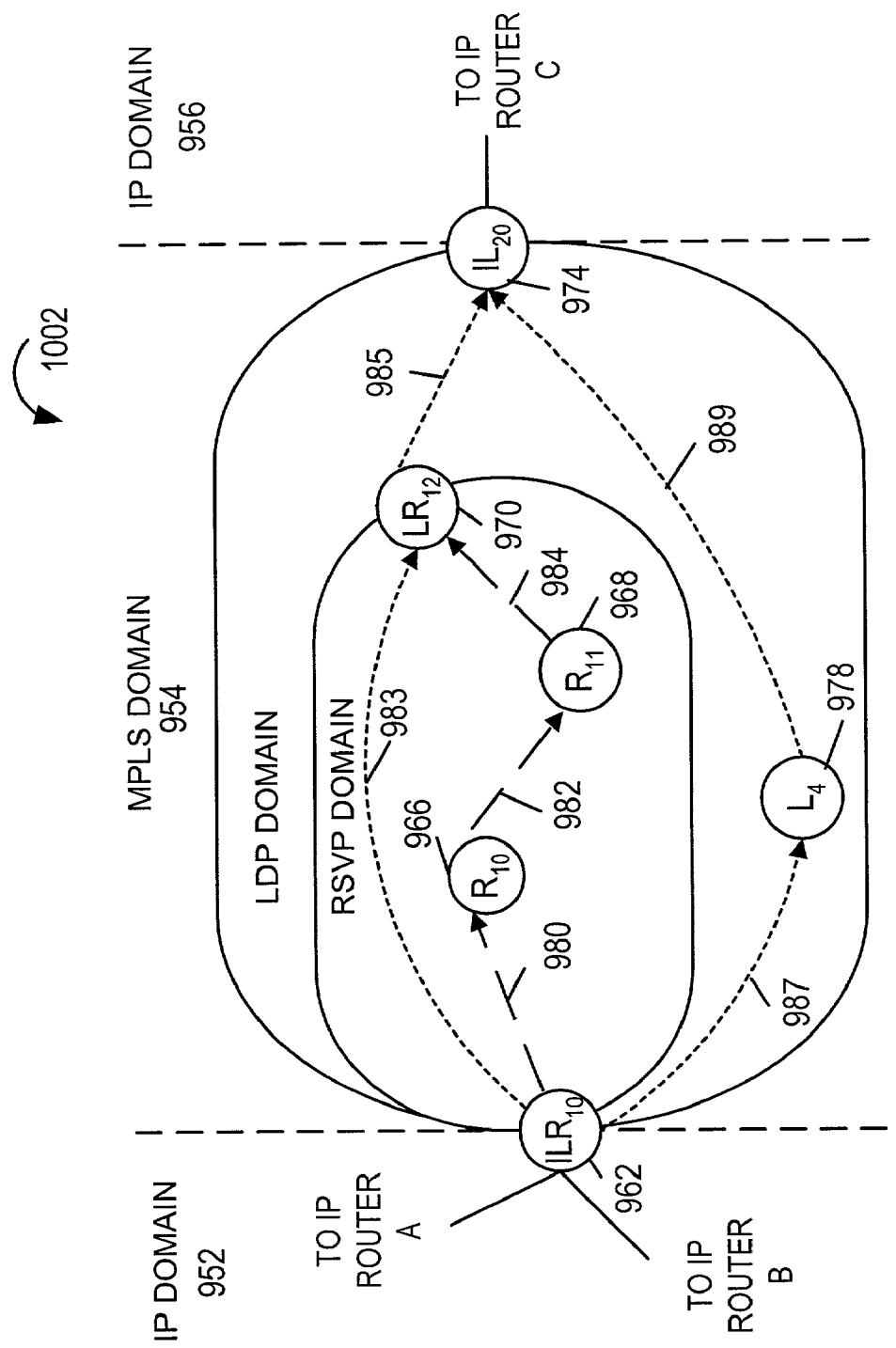
FIG. 10 illustrates a network wherein two alternative LDP LSPs through a network are possible.

FIG. 10 illustrates a network 1000 wherein an AS 1002 is used to connect IP domains 952, 956. The AS 1002 represents an MPLS domain 952 which includes an LDP domain 955 and an RSVP domain 957. The AS 1002 includes a first LSR $ILR_{10}$ 962 which supports IP, LDP and RSVP. In addition, it includes LSRs $R_{10}$ 966 and $R_{11}$ 968 which support RSVP but not IP or LDP and LSR $LR_{12}$ 970 which supports LDP and RSVP but not IP. The AS 1002 also includes LSR $L_4$ 978 which supports LDP but not IP or RSVP and LSR $IL_{20}$ 974 which supports IP and LDP but not RSVP. In accordance with the present invention an RSVP LSP comprising RSVP hops 980, 982, 984 can be used to tunnel an LDP LSP between routers $ILR_{10}$ 962 and $LR_{12}$ 974. When used for tunneling an LDP LSP, RSVP LSP hops 980, 982, 984 appear to a router running LDP as a single LDP hop 983 which can be considered for LDP LSP route determination purposes.

Accordingly, to establish an LDP LSP to transmit packets from IP domain 952 to IP domain 956 $ILR_{10}$ 962 can select from two alternative possible paths available to it based on the network information which will be known to the router $ILR_{10}$ 962 based on LDP message information. The first possible path comprises two LDP hops, hop 983 and hop 985. Hop 983 corresponds to the RSVP LSP and involves RSVP LSP hops 980, 982 and 984 while hop 985 is between $LR_{12}$ and $IL_{20}$. The second possible path also comprises two LDP hops 987 and 989 but avoids the use of the RSVP tunnel by routing packets through router $L_4$ 978.

In accordance with one embodiment of the present invention the cost associated with each of the two potential paths is the same, e.g., two hops, since each of the alternative paths includes two LDP hops. As discussed above, in accordance with the invention LDP LSPs include one or more RSVP LSP tunnels are preferred over those which do not use an RSVP tunnel. Accordingly, since the cost metric, e.g., 2 hops, associated with each potential LDP LSP path is the same, the first path including the RSVP tunnel will be selected by router $ILR_{10}$ 962 for transmitting packets across the MPLS domain 983.

While the selection between competing routes using a least cost route selection process has been explained in terms where the relevant cost is measured in terms of a hop count, alternative cost metrics may be associated with potential LDP LSP routes and used for route selection purposes. However, as discussed above, in various embodiments when the cost metrics for competing routes are the same, routes including RSVP LSPs used for tunneling LDP LSPs, e.g., traffic engineered routes, will be preferred over routes having the same cost but which do not include the use of an RSVP LSP.

Numerous variations on the above described methods and apparatus are possible without departing from the scope of the invention.

For example, the LDP LSP tunneling techniques may be used to implement virtual private networks. In such an embodiment an additional label may be used to implement the VPN. In such an embodiment, the additional VPN label would be used as the innermost label with label stacking being enabled on the LDP routers as well as the routers which support both LDP and RSVP.

What is claimed is:

1. A communications method, comprising:
establishing a first label switched path traversing a first portion of a communications network using Resource ReSerVation Protocol ("RSVP") messaging; and
establishing a second label switched path using Label Distribution Protocol ("LDP") messaging, the second label switched path traversing said first label switched path and using the first label switched path to tunnel at least a portion of the second label switched path.

2. The communications method of claim 1,
wherein the first label switched path includes a first path ingress router and a first path egress router; and
wherein establishing a second label switched path includes:
initiating a remote LDP communications session between the first path ingress router and the first path egress router; and
exchanging, during the remote LDP communications session, at least one label to be used when transmitting packets between the first path ingress router and the first path egress router.

3. The method of claim 2, wherein said communications network is an autonomous system.

4. The method of claim 2,
wherein the second communications path further comprises a second path ingress router and a second path egress router; and
wherein establishing a second label switched path using LDP messaging includes storing a first second path (LDP) label in the second path ingress router to be used when the second path ingress router transmits a packet along said second path.

5. The method of claim 4, further comprising the steps of:
operating the second path ingress router to add said first second path label to a packet; and
transmitting the packet with the second path label along said second path.

6. The method of claim 4,
wherein the first path ingress router is a transmit router in said second path; and
wherein establishing a second label switched path using LDP messaging includes storing a second second path label in the first path ingress router to be used when the first path ingress router transmits a packet corresponding to said second path over said first path.

7. The method of claim 6, further comprising the steps of:
operating the first path ingress router to receive a packet including a label corresponding to the second path; and
operating the first path ingress router to swap the label included in the received packet with said second second path label and to add a first first path label as an outer label thereby generating a packet with a stacked label.

8. The method of claim 7, wherein the first path includes a first path penultimate router, the method further comprising the steps of:

operating the first path (RSVP) penultimate router to receive a packet with stacked labels transmitted along said first path, the stacked labels including an outer label corresponding to said first path and an inner label corresponding to said second path;

operating the penultimate router to pop the outer label from the received packet with stacked labels to produce a packet having said inner label corresponding to said second path as an outer label; and transmitting the produced packet to the first path egress router.

9. The method of claim 8, further comprising the steps of:

operating the first path egress router to receive the packet produced by the first path penultimate router; and operating the first path egress router to perform a label swapping operation to produce a packet having an outer label corresponding to the second path which is different from the outer label of the packet produced by the first path penultimate router.

10. A method of operating a router, the method comprising:

receiving a packet;

adding to the packet a first label corresponding to a first label switched path established using label distribution protocol messaging; and adding to the packet a second label corresponding to a second label switched path established using Resource ReSerVation Protocol ("RSVP") messaging, the second label corresponding to an RSVP tunnel.

11. The method of claim 10, further comprising the step of:

transmitting the packet with the first and second labels to a router which supports RSVP messaging.

12. The method of claim 10, further comprising:

prior to receiving a packet, receiving an RSVP message including the second label to be used with the second label switched path; and receiving during a remote LDP communications session, the first label corresponding to the first label switched path.

13. The method of claim 12, wherein the step of:

adding to the packet a first label is performed as part of a label swapping operation wherein the added label is used to replace another label corresponding to the first label switched path.

14. A communications method, the method comprising the steps of:

using Resource ReSerVation Protocol ("RSVP") messaging to establish a first label switched path through a first portion of a communications network;

using Label Distribution Protocol ("LDP") messaging to establish a second label switched path through a second portion of the communications network, the second portion including said first portion; and using the first label switched path to tunnel a portion of the second label switched path through the first portion of the communications network.

15. The communications method of claim 14, further comprising the steps of:

operating a router included in the first and second label switched paths to perform a label stacking operation on a packet being communicated along said first and second paths, the label stacking operation including:

adding to the packet an inner label, corresponding to the second label switched path; and adding to the packet an outer label, corresponding to the first label switched path.

16. The communications method of claim 15, wherein the step of adding to the packet an inner label and the step of adding to the packet an outer label are performed as part of a double label push operation.

17. The communications method of claim 15, wherein the step of adding to the packet an inner label is performed as part of a label swap operation and wherein the step of adding to the packet an outer label is performed as part of a label push operation.

18. An apparatus for transmitting data, the apparatus comprising:

first label switched path establishment means for establishing at least a portion of a first label switched path through the use of Resource ReSerVation Protocol ("RSVP") messaging; and second label switched path establishment means for using label distribution protocol messaging to establish at least a portion of a second label switched path which traverses said portion of a first label switched path and which uses the first label switched path to tunnel said at least a portion of the second label switched path; and packet forwarding circuitry coupled to said first label switched path establishment means and said second label switched path establishment means, said packet forwarding circuitry for forwarding packets over at least the first label switched path.

19. The apparatus of claim 18, further comprising:

means for stacking labels on a packet being transmitted on said first switched path so that the packet includes an outer label corresponding to the first label switched path and an inner label corresponding to the second label switched path.

20. A communications network, comprising:

a first router implementing Resource ReSerVation Protocol ("RSVP") messaging;

a second router implementing RSVP and label distribution protocol messaging coupled to said first router and including means for tunneling communications path established using label distribution protocol messaging through a path established using RSVP messaging; and a third router implementing RSVP and label distribution protocol coupled to said second router by the first router.

21. The communications network of claim 20, further comprising:

a fourth router implementing Internet Protocol and label distribution protocol messaging being coupled to the second router; and a fifth router implementing the Internet Protocol and label distribution protocol messaging being coupled to the third router.

22. The communications network of claim 21, wherein the first, second, third, fourth and fifth routers are part of the same autonomous system.

23. The communications network of claim 22, wherein the second router includes means for tunneling a label switched path established using label distribution protocol messaging through a label switched path established using RSVP messaging.

24. The communications network of claim 20, further comprising:

a fourth router implementing label distribution protocol messaging coupling the first router to the third router.

25. The communications network of claim 24, wherein the first router includes network configuration information learned from label distribution protocol messages, the network configuration information indicating that a label switched path can be established to the third router via a first route including an RSVP label switching path tunnel and a second route which does not include an RSVP label switched path tunnel.

26. The communications network of claim 25, further comprising:
   route selection logic in the first router for selecting between the first and second routes as a function of cost information associated with each route and said information indicating the first route involves use of an RSVP label switched path tunnel.

27. The communications network of claim 26, wherein the route selection logic selects a route which uses an RSVP label switched path tunnel when the cost information associated with the label switched path which uses the RSVP label switched path tunnel indicates an equal cost to the cost associated with an alternative path which does not use said RSVP label switched path tunnel.

* * * * *